H. CARLSON.
POTATO PICKER.
APPLICATION FILED JAN. 15, 1920.
1,384,823.
Patented July 19, 1921.
3 SHEETS—SHEET 1.
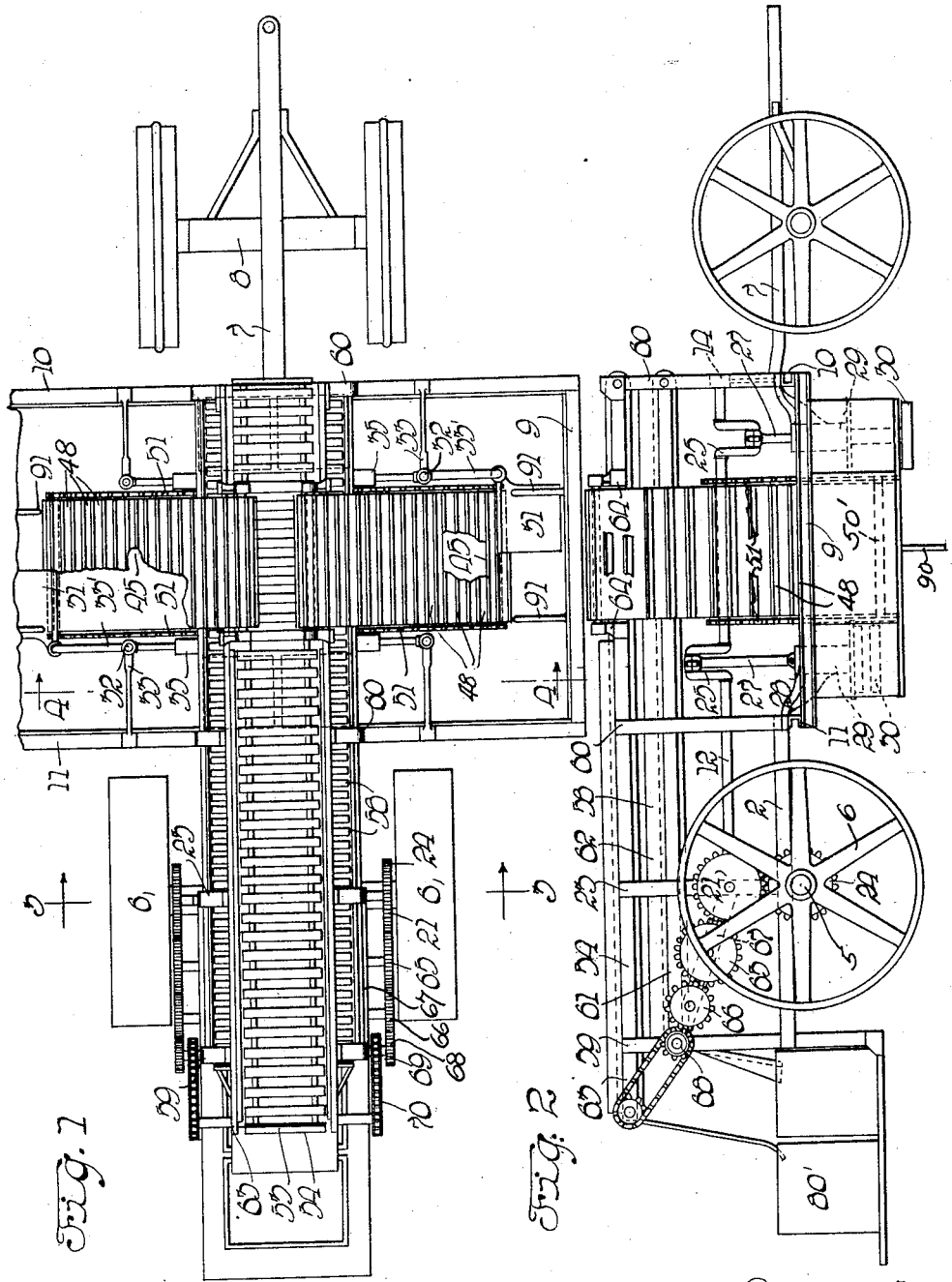
Inventor
Hilmer Carlson
By Brown, Boettcher & Dienner
Attorneys

H. CARLSON.
POTATO PICKER.
APPLICATION FILED JAN. 15, 1920.

1,384,823.

Patented July 19, 1921.
3 SHEETS—SHEET 2.

Inventor
Hilmer Carlson
By Brown, Boettcher & Dienner
Attorneys

H. CARLSON.
POTATO PICKER.
APPLICATION FILED JAN. 15, 1920.
1,384,823.
Patented July 19, 1921.
3 SHEETS—SHEET 3.
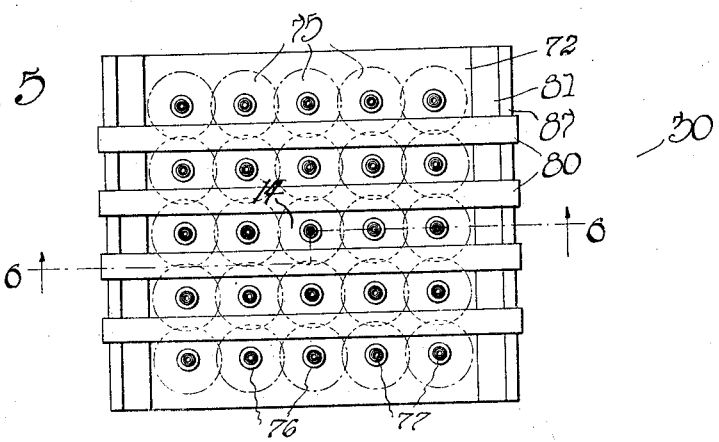
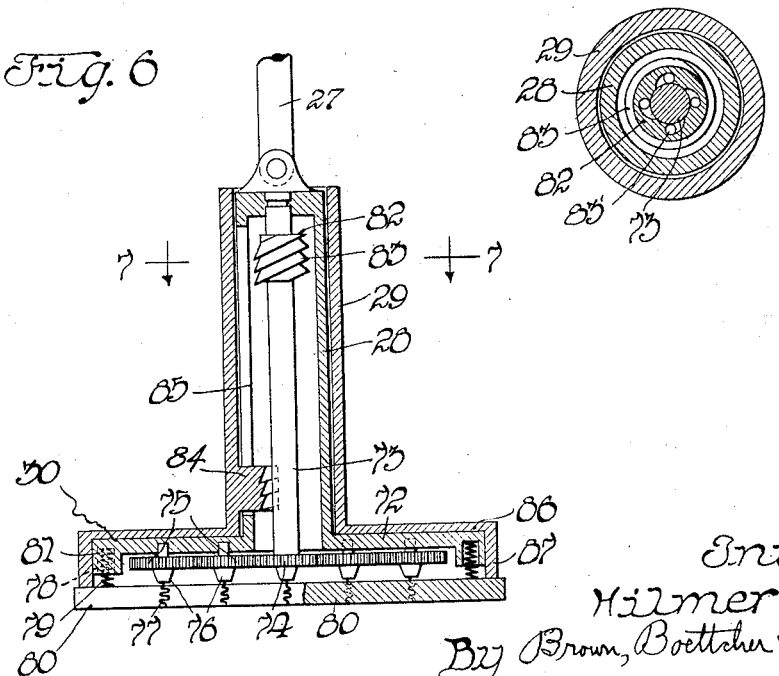
Inventor
Hilmer Carlson
By Brown, Boettcher & Dienner
Attorneys

UNITED STATES PATENT OFFICE.

HILMER CARLSON, OF CHICAGO, ILLINOIS, ASSIGNOR TO HILMER F. CARLSON AND COMPANY, OF CHICAGO, ILLINOIS, A CORPORATION OF ILLINOIS.

POTATO-PICKER.

1,384,823.   Specification of Letters Patent.   Patented July 19, 1921.

Application filed January 15, 1920. Serial No. 351,674.

*To all whom it may concern:*

Be it known that I, HILMER CARLSON, a citizen of the United States, residing at Chicago, in the county of Cook and State of Illinois, have invented a certain new and useful Improvement in Potato-Pickers, of which the following is a full, clear, concise, and exact description, reference being had to the accompanying drawings, forming a part of this specification.

My invention relates to improvements in potato pickers.

While my invention is particularly adapted for use in connection with picking potatoes or vegetables of the like character, I do not intend to limit the invention to such use or purpose only.

It has been customary in devices of the prior art to provide endless carriers or spiral conveyers for gathering potatoes or the like. The endless carriers generally have teeth or prongs projecting outwardly which rake the soil, and gather the potatoes and carry them to an assorter. The chief disadvantage of this construction is that, not only the potatoes are gathered, but also rocks and brush. Where the land is unlevel and hillocks are prevalent, the potatoes often remain ungathered, due to the inability of the carriers to adjust themselves to the run of the land. In case of the spiral conveyers, only the surface potatoes are gathered, while the potatoes which are covered to such a depth that the teeth of the conveyer do not engage, remain ungathered. A further disadvantage of the prior art structures is that boulders and obstructions too large for the carriers to gather would often bend and break the prongs or teeth.

In accordance with the teachings of my invention, I have made provision whereby only the potatoes are removed from the soil, and if rocks should appear, they will be passed over without destroying the means provided for lifting the potatoes. This means is in the form of lifting shoes, which reciprocate upon the frame of the chassis, having spiral needles on the under side which rotate as they engage the potatoes, and hence, thread therein. In order to remove the potatoes from the shoe after it returns to the upper position, I have provided strippers thereon which remove the potatoes from the needles without splitting or chopping them. A further object of my invention is to carry the potatoes after they are removed from the shoes to an elevator whereby they are then poured onto a screen. This screen assorts the potatoes according to size and conveys them into separate bins.

By my construction, I am able to gather not only the surface potatoes, but also the potatoes which may either be turned over by the plow, digging the potatoes, or those which the plow does not dig. To this end provision is made whereby the surface potatoes are first gathered, the soil turned over and the remaining potatoes then gathered.

It is a further object of my invention to provide a machine which will eliminate the heretofore extra attendants during the harvesting of potatoes. This is accomplished by operating the various mechanism in conjunction with travel of the machine, so that, as the machine is moved over the ground, the shoes actuate by means of an operable drive with the traction wheels. This automatic operation reduces to a minimum the number of attendants required.

A further object of my invention is the provision of a picker of simple, durable and rugged construction of low cost, which will be capable of simple, reliable and effective operation and maneuvering upon various kinds of soil.

In order that those skilled in the art may be fully acquainted with the nature and scope of my invention, I shall describe a specific embodiment of the invention in connection with the accompanying drawings which form a part of the present specification.

Figure 1 is a top plan view of a potato picker embodying my invention with part of the sub-frame broken away;

Fig. 2 is a side elevational view of the same;

Fig. 5 is a plan view of the shoes which gather the potatoes from the ground;

Fig. 6 is a sectional view of the shoes taken on the line 6—6 of Fig. 5; and

Fig. 7 is a cross sectional view taken on the line 7—7 of Fig. 6.

Figure 3:
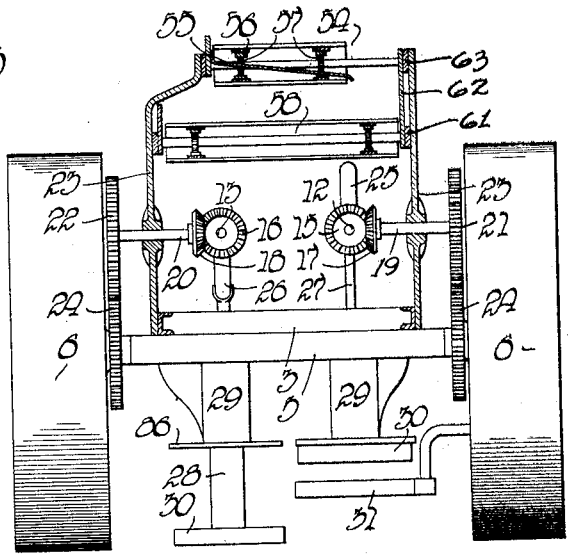
Fig. 3 is a transverse sectional view taken on the line 3—3 of Fig. 1 with parts omitted.

Referring to the drawings, the chassis of my improved potato picker comprises a longitudinal sill member 2, the front transverse sill 3 and the rear transverse sill member, not shown. The rear sill member suitably carries the rear axle 5 on which is carried the rear traction wheels 6. The sub-frame on which is carried the main operating parts of my device is suitably mounted on the chassis frame and the reach 7, fastened to the front axle 8 in the usual manner, and to this reach 7 is attached the means which drives the potato picker, such as a tractor or the like.

The sub-frame comprises longitudinal channel irons 9 secured to the front and rear transverse extending channel irons 10 and 11. These channel irons 10 and 11 may be suitably carried by the chassis frame and reach 7 as shown, or by an extension of the longitudinal sill members 2 of the chassis frame.

The longitudinal drive shafts 12 and 13 are at their front ends suitably journaled in the bearings 14 which bearings 14 are mounted on the front channel iron 10. The other or opposite end of the drive shafts 12 and 13 has secured thereto bevel gears 15 and 16 driven by the coöperating bevel gears 17 and 18. The bevel gears 17 and 18 are suitably mounted upon the inner ends of the stub-shafts 19 and 20, and the other ends of the stub-shafts 19 and 20 carry the gears 21 and 22. The upright or standards 23 have suitable bearings therein for carrying the shafts 19 and 20. Meshing with the gears 21 and 22 are the gears 24—24 carried by the rear traction wheels 6.

Figure 4:
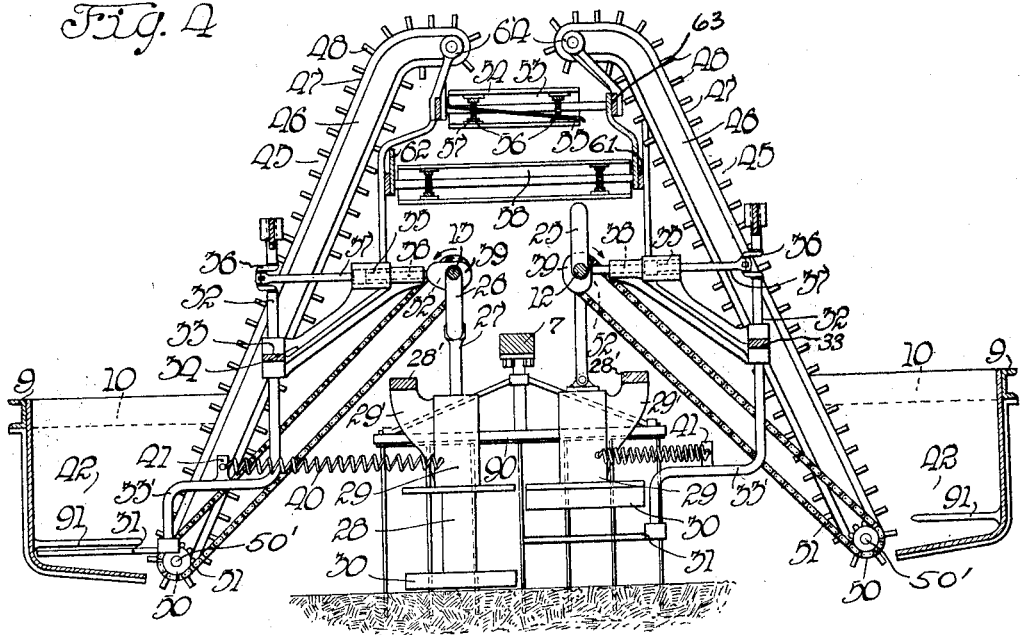
Fig. 4 is a transverse fragmentary sectional view taken on the line 4—4 of Fig. 1.

The longitudinal drive shafts 12 and 13 are provided with cranks 25 and 26 and to these cranks 25 and 26 the rods 27 are secured. The lower or opposite ends of the rods 27 are pivoted to sleeve members 28 which are mounted in the stationary guides 29. These stationary guides 29 may be suitably mounted on the sub-frame in any suitable manner, as illustrated in Fig. 4. The guides 29 are provided with an upwardly extending portion 29', having the upper end bent horizontally so as to provide suitable fastening means. This horizontal bend may be lapped over the transverse irons 10 and 11 and securely fastened thereto, or it may be bolted to the underside of the irons 10 and 11 as desired. The lower end of the sleeve members 28 carry the shoes 30 which are the means by which the potatoes are removed and gathered from the ground. The shoes 30 are provided with rotating needles which have the lower portion formed spirally, so that as the needles engage the potatoes, they thread into the same. After the potatoes are threaded on the needles or vice versa, stripper bars which are also provided on the shoes 30 project downwardly into a vertical path and strip the potatoes off the shoes.

It will be seen by referring more particularly to Figs. 1 and 4 that as the shafts 12 and 13 are driven by the rear traction wheels, when the vehicle is in motion the shoes 30 will reciprocate in a vertical path and due to the guides 29 the angular motion of the rods 27 is not imparted to the shoes. Thus, the shoes travel in a straight path permitting each shoe of a pair as shown in the above referred to figures, to be placed in close proximity to each other. By this arrangement, the potato picker removes the potatoes in a path substantially the width of a pair of shoes and as the shoes are provided in pairs alined with the axis of the chassis frame, the surface potatoes are first permitted to be gathered while a rake disposed between the two pairs disturbs the soil and brings the potatoes below the soil to the top, thereby allowing the second pair of shoes to gather that which remains. In other words the second pair of shoes gather that which the first pair leaves.

As hereinbefore mentioned the stripper bars which will hereinafter be described in detail strip the potatoes from the needles into a pan 31 or other suitable receptacle, when the shoes are raised in their uppermost position. The pan 31 is suitably secured to the lower end of the vertical shaft 32, the shaft 32 having a horizontal arm portion 33' at the said lower end. Each shoe is provided with one of these vertical shafts 32 and pans 31. Any suitable supporting means may be provided to carry the shaft 32, but I preferably show a yoke bracket 33, which may be secured to the chassis frame or sub-frame as desired. The bracket 33 is provided with an inwardly extending supporting arm 34, which supporting arm forms a guide 35. The driving means for the shaft 32, which as shown, possesses a rotary oscillatory motion, comprises a crank 36 on the upper part of the shaft 32, a rod 37 having operable connection therewith and a pin 38 having a pivoted connection with the rod 37. The pin 38 is carried in the guide 35, the other or opposite end of the pin 38 projecting from the guide 35 so as to permit the cam 39 provided on the longitudinal driving shaft to engage therewith. The pin 38 is held against the cam 39 by means of a spring 40. As shown in Fig. 4, the spring is preferably fastened at one end to a lug 41 which is formed on the portion 33' of the vertical shaft 32, the other or opposite end of the spring 40 being fastened to the stationary guide 29. The cam 39 is timed so that it will rotate the shaft 32 and move the pan 31 away from the shoe 30 upon downward movement of the same. The pan 31 is then swung to the hoppers 42 where it disposes of the material received from the shoe 30. In order to completely clean the pan 31 of the mentioned material, a wiper 91 is suitably formed in any preferred manner on the hopper 42.

As my invention is not concerned with the structural details of the device, and consequently the hoppers 42, it is sufficient to say that the hoppers may be formed by suitable material such as sheet metal and the like, on the longitudinal channel irons 9 and transverse channel irons 10 and 11 of the sub-frame. Although not shown, the sheet metal may extend inwardly to such an extent that it will form a chute or the like inclined inwardly to catch any material which may accidentally be jarred from the pan 31 on its travel to the hoppers. From the hoppers 42 the material is conveyed by elevators 45 to the upper part of the vehicle.

It is to be noted that the term "material" is employed, as it is evident to those skilled in the art that my device may be employed for more than merely removing or gathering potatoes.

The elevator 45 has side plates 46 which carry the apron 47. The apron may be provided with any suitable means for retaining the material as it is elevated to the sizing means which will be presently described. I have shown slats 48 disposed laterally and suitably mounted on the apron 47, which apron is of the endless type. At the lower end of the elevator and on each side thereof gears 50 are mounted on the shaft 50' which drive the apron by means of the chains 51 and gears 52 mounted on the longitudinal drive shafts 12 and 13.

The sizing means as hereinbefore mentioned comprise a plurality of carrier screens which assort the material according to size. These carrier screens are disposed one above the other, the top screen permitting the smaller material to pass onto the lower screen thereby retaining and conveying the larger material to a separate bin 80'. The top carrier screen 53 receives the material from the elevators 45 and having its apron formed of slats 54 evenly spaced apart the smaller material is allowed to pass therethrough to a deflecting plate 55. The carrier 53 is of the usual construction, having the slats 54 evenly spaced and secured to horizontal chains 56 trained over sprockets 57 on the transverse shafts at each end of the run. The carrier screen 58 is preferably of a greater width than the carrier screen 54. The deflecting plate 55 permits the material to fall to the carrier screen 58, as is shown in Figs. 3 and 4. It is thought unnecessary to describe in detail the carrier 58, as it may be constructed similar to the screen 54, if so desired.

The supporting structure for the carrier screens 54 and 58 comprises the uprights 23, 59 and 60. The front uprights 60 are carried by the channel irons 10 of the sub-frame, the intermediate uprights 60 are carried by the longitudinal sill member 2 of the chassis, and the uprights 59 are carried by the rear end of the chassis frame. Side plates 61 mounted on the uprights serve as side guiding members for the carrier 58 and also as means for carrying the members 62 which guide the material from rolling laterally off the apron of the carrier screen 58. The side plates 63 are similarly mounted on the uprights and function the same as the plates 61. The side plates 63 have secured thereto suitable bearing brackets 64 for carrying the upper ends of the elevators 45.

As hereinbefore described the traction wheels 6 carry the gears 24 which gears mesh with the gears 21. The idlers 65 and 66 are suitably mounted on the uprights as by a diagonal member 67. The idler 66 drives a gear 68 mounted on the end transverse shaft of the carrier 58. The sprocket 69 on the transverse shaft drives a second sprocket on the end transverse shaft of the carrier 54 by means of the chain 70.

Referring more particularly to Figs. 5, 6 and 7, it will be seen that the shoe 30 comprises a sleeve member 28, having formed at its lower end the block 72. Concentrically disposed within the sleeve member 28 is the rod 73, which is journaled therein at its upper end, and which carries at its lower end the gear 74. The gear 74 meshes with and drives a plurality of gears 75 which gears 75 are journaled in any suitable manner in the block 72. Formed on the underside of the gears 74 and 75 are the sockets 76 which are adapted to receive needles 77, having their lower ends of spiral formation. The block 72 has formed thereon at each end depending flanges 81 in which are formed the pockets 78. The tension spring 79 disposed in the pockets 78 have fastened at their outer ends the stripper bars 80, which bars are adapted to lie between two rows of gears, as shown in Fig. 5. The sleeve 82 rotatably mounted on the rod 73 is provided with the threads 83, and as the member 28 moves downwardly in the guiding sleeve 29, the threads 83 engage the threaded segment 84 formed on the sleeve 29 and traveling in the slot 85. Thus it will be seen that the rod 73 does not rotate until the shoe is approximately in lowermost position. In order to prevent rotation of the rod 73 on the upward travel of the shoe a ball clutch 83' is provided, although it is apparent that other various means may be employed. The lower end of the guide 29 carries a plate 86 having depending flanges 87 which are adapted to engage the projecting ends of the stripper bars 80. This forces the bars downwardly which causes the material gathered on the needles 77 to be stripped therefrom.

By reference to Fig. 4 the rake 90 is suitably carried by the reach 7. This rake 90 is substantially of the same width as a pair of shoes so that it disturbs only the ground over which the shoes 30 travel.

The operation of the device is apparent from the foregoing description. The front pair of shoes 30 remove the material to be gathered from the surface whereas the rear pair of shoes 30 remove the material, either which the front shoes failed to remove or which the rake 90 brings to surface while disturbing the soil. The movement of the pans 31 are so timed in relation to the shoes that they are in position to catch the material from the shoes when the same are in upper position.

It is to be noted that the actuation of the shoes 30 and the pans 31 together with the elevators 45 and assorters is automatic, as they are driven by means of an operable drive with the rear wheels 6 of the chassis frame. This has for its purpose the reducing to a minimum the number of attendants necessary for the machine, the only manual labor required being that of emptying the bins 80'; the machine, of course, being drawn by any suitable means such as a tractor.

I do not intend to be limited to the precise details of construction shown and described, as it will be apparent to those skilled in the art that modifications may be made in the embodiment of the invention without departing from the invention as defined in the following claims.

I claim:

1. In combination, a chassis frame, shoes mounted on said frame, means for reciprocating said shoes, and mechanical means on said shoes for removing potatoes from the ground.

2. In combination, a chassis frame, shoes mounted on said frame, means for reciprocating said shoes, mechanical means on said shoes for positively engaging potatoes lying on the ground, and means for removing the potatoes from the shoes.

3. In combination, a chassis frame, shoes mounted on said frame, means for reciprocating said shoes, means on the underside of the shoes for engaging the potatoes, means for removing the potatoes from the shoes, and a receptacle carrying the potatoes to an elevator whereby they are conveyed to a carrier.

4. In combination, a chassis frame, shoes mounted on said frame, means for reciprocating said shoes, means on the underside of the shoes for lifting potatoes from the soil, means for removing the potatoes from the shoes, means carrying the potatoes to an elevator, whereby they are conveyed to carriers, said carriers sorting the potatoes before conveying them to bins.

5. In combination, a chassis frame, shoes mounted on said frame, means reciprocating said shoes, said shoes lifting potatoes from the soil and means on said chassis for sorting the potatoes according to size before conveying them to bins.

6. In a potato picker, a chassis frame, shoes mounted on said frame for removing the potatoes from the soil, means actuating the shoes in a vertical motion, said means comprising a driving connection from the wheels of the chassis frame whereby said shoes are actuated by movement of the machine.

7. In a potato picker, a chassis frame, shoes mounted on said frame for lifting the potatoes from the ground, means actuating the shoes in a vertical motion, said means comprising a longitudinally extending shaft having a gear meshing with a gear on the rear wheel of the chassis frame, and a crank for driving rods operably connected to the shoes.

8. In a potato picker, a chassis frame, shoes mounted on said frame for lifting the potatoes from the ground, means reciprocating the shoes, said means comprising a longitudinally extending shaft having operable connection with the rear wheels and an operable connection with the vertical rods carrying the shoes.

9. In a potato picker, a chassis frame, shoes on said frame, means for engaging the underside of the shoes with the ground, means on the shoes lifting the potatoes from the ground, said means comprising rotating spiral needles.

10. In a machine of the class described, the combination with a chassis frame, of shoes on said frame, means for alternately reciprocating said shoes, spiral shaped needles rotatably mounted on said shoes, means for rotating said needles during the engagement with the potatoes lying on the ground.

11. In a machine of the class described, the combination with a chassis frame, shoes on said frame, a driving connection between the shoes and wheels on the chassis, said shoes adapted to alternately reciprocate, rotatably mounted sockets for carrying needles on the underside of said shoes, gears carried by said socket and means driving said gears for rotating the needles as the same engage the potatoes.

12. In a machine of the class described, the combination with a supporting frame, of shoes on said frame, a driving connection for alternately reciprocating said shoes, rotatable mounted gears carried by the shoes, needles driven by said gears, and means carried by said shoes for removing the potatoes from the needles.

13. In a machine of the class described, the combination with a supporting frame, of shoes on said frame, a driving connection for alternately reciprocating said shoes, rotatably mounted gears carried by the shoes, needles driven by said gears, sockets for said needles, means carried by said shoes for removing the potatoes from the needles, said means comprising stripper bars adapted to project downwardly when the shoes return to upper position.

14. In a machine of the class described, the combination with a supporting frame, of shoes on said frame, a driving connection for alternately reciprocating said shoes, spiral tipped needles on said shoes, socket members for said needles, gears on said socket members and means driving said gears when the shoes are in lowermost position whereby said needles thread into potatoes lying on the ground.

15. In a machine of the class described, the combination with a supporting frame, of shoes on said frame, a driving connection for alternately reciprocating said shoes, needles on said shoes having the outer ends of threaded formation, sockets for said needles, gears rotating said needles, means driving said gears when the shoes are in lowermost position for engaging the needles with potatoes lying on the ground and stripper means removing the potatoes when the shoes return to uppermost position.

16. In a machine of the class described, the combination with a supporting frame, of shoes on said frame, a driving connection alternately reciprocating said shoes, needles on said shoes having the outer ends of threaded formation, sockets for said needles, gears rotating said needles, means driving said gears when the shoes are in lowermost position, said means comprising a centrally disposed rod having a threaded sleeve engaging a stationary segment for rotating the rod on the downward travel of the shoes.

17. In a machine of the class described, the combination with a supporting frame, of shoes on said frame, a driving connection alternately reciprocating said shoes, needles on said shoes having the outer ends of threaded formation, sockets for said needles, gears rotating said needles, means driving said gears when the shoes are in lowermost position, said means comprising a centrally disposed rod having a threaded sleeve engaging a stationary segment for rotating the rod on the downward travel of the shoe, and means causing the sleeve to freely slip around the rod on upward travel of the shoe.

18. In a machine of the class described, the combination with a supporting frame, of shoes on said frame, a driving connection alternately reciprocating said shoes, said driving connection comprising a longitudinally extending shaft carried by said frame, cranks on said shaft, rods operatively connected to said crank, the other end of said rods pivoted to sleeve members reciprocating in stationary guide members, the shoes being formed on the lower end of the sleeve members, spiral formed needles carried by the shoes and adapted to rotate as the shoes move to lowermost position.

19. In a machine of the class described, the combination with a supporting frame, of shoes on said frame, a driving connection alternately reciprocating said shoes, said driving connection comprising a longitudinally extending shaft carried by said frame having operable connection with traction wheels on the supporting frame, cranks on said shaft, rods operatively connected to said cranks, reciprocating sleeves at the lower ends of the rods, guide members for said reciprocating sleeves, the shoes being formed on the other ends of the reciprocating sleeves, spiral formed needles carried by the shoes to engage potatoes lying on the ground as the shoes reciprocate downwardly, a stop member formed on the guide members engaging the shoes when in uppermost position, means on said stop members causing strippers carried by the shoes to remove the potatoes from the needles.

20. In means for gathering potatoes comprising the combination of a plurality of shoes adapted to alternately engage the ground, and spiral formed needles on the under side of the shoes adapted to rotate and thread into the potato.

21. In means for gathering potatoes comprising, a plurality of shoes, needles having spiral formed ends on the under side of the shoes, means for rotating the needles when the same engage the potatoes, and stripper bars adapted to project downwardly to remove the potatoes from the needles.

22. In a potato picker, a chassis frame, a longitudinally extending shaft on said frame, a gear at one end of said shaft meshing with a gear driven by the rear wheels of the chassis, cranks disposed on said shaft, shoes having operative connection with the cranks, vertical shafts, a pan at the lower end of the vertical shafts, a crank at the upper end of the vertical shafts, a driving connection between the horizontal shaft and the cranks on the vertical shafts for oscillating the same, said pans adapted to move under said shoes when in upper position, a hopper receiving said pans when the shoes are in lower position, and means removing the material collected in the pans to said hopper.

23. In a potato picker, a chassis frame, a longitudinally extending shaft on said frame, a gear at one end of said shaft meshing with a gear driven by the rear wheels of the chassis, cranks disposed on said shaft, shoes having operative connection with the cranks, vertical shafts, pans at the lower end of the vertical shafts, cranks at the upper end of the vertical shafts, driving connection between the horizontal shaft and the cranks on the vertical shafts for oscillating the same, said pans adapted to move under said shoes when in upper position, a hopper receiving said pans when the shoes are in lower position, means removing the material collected in the pans to said hopper, and an elevator adjacent said hopper adapted to convey the said material to sizing means on said chassis frame.

24. In a potato picker, a chassis frame, a longitudinally extending shaft on said frame, a gear at one end of said shaft having operable driving connection with the rear wheels of the chassis, cranks disposed on said shaft, shoes having operative connection with the cranks, vertical shafts, pans at the lower end of the vertical shafts, cranks at the upper end of the vertical shafts, a driving connection between the horizontal shaft and the crank on the vertical shafts for oscillating the same, said pans adapted to move under said shoes when the shoes are in upper position, a hopper receiving said pans when the shoes are in lower position, means removing the material collected in the pans to said hopper, an elevator adjacent said hopper adapted to convey said material to sizing means on said chassis frame, said sizing means comprising a plurality of carrier screens adapted for sorting the material into separate bins.

In witness whereof, I hereunto subscribe my name this 8th day of January, A. D. 1920.

HILMER CARLSON.